United States Patent
Bertolotti et al.

(10) Patent No.: US 8,727,921 B2
(45) Date of Patent: May 20, 2014

(54) BELT-DRIVEN DRIVE-TRAIN

(75) Inventors: Fabio P. Bertolotti, South Windsor, CT (US); John P. Wesson, Vernon, CT (US)

(73) Assignee: United Technologies Corporation, Hartford, CT (US)

( * ) Notice: Subject to any disclaimer, the term of this patent is extended or adjusted under 35 U.S.C. 154(b) by 2159 days.

(21) Appl. No.: 11/484,941

(22) Filed: Jul. 12, 2006

(65) Prior Publication Data

US 2007/0015617 A1 Jan. 18, 2007

Related U.S. Application Data

(60) Provisional application No. 60/698,719, filed on Jul. 12, 2005.

(51) Int. Cl.
*F16H 7/00* (2006.01)

(52) U.S. Cl.
USPC .................................................. 474/87

(58) Field of Classification Search
USPC ..................................... 474/84–88
See application file for complete search history.

(56) References Cited

U.S. PATENT DOCUMENTS

| | | | | |
|---|---|---|---|---|
| 4,282,443 | A * | 8/1981 | Seidl | 290/1 R |
| 5,030,174 | A * | 7/1991 | Eguchi | 474/153 |
| 5,663,600 | A | 9/1997 | Baek et al. | |
| 6,086,494 | A * | 7/2000 | Crosta | 474/88 |
| 6,223,611 | B1 * | 5/2001 | Kelley | 74/89.21 |
| 6,459,165 | B1 | 10/2002 | Schoo | |
| 7,011,598 | B2 | 3/2006 | Flamang et al. | |
| 7,217,091 | B2 * | 5/2007 | LeMieux | 416/95 |
| 2006/0251516 | A1 * | 11/2006 | Sohn | 416/132 B |

FOREIGN PATENT DOCUMENTS

| | | |
|---|---|---|
| DE | 32 22 007 A1 | 12/1983 |
| DE | 37 19 006 A1 | 12/1988 |
| DE | 40 39 207 A1 | 6/1992 |

(Continued)

OTHER PUBLICATIONS

Machine translation from EPO for DE 4113624 A1.*

(Continued)

*Primary Examiner* — Anna Momper
(74) *Attorney, Agent, or Firm* — Carlson, Gaskey & Olds (57) ABSTRACT

An example drive train assembly for a power conversion system includes a first sprocket which defines an axis of rotation, at least two secondary sprockets adjacent to the first sprocket and at least one belt. The axis of rotation lies outside of an area defined by the belt. The belt is operable to transfer mechanical power between the first sprocket and the two secondary sprockets in response to a rotation of the first sprocket about the axis of rotation. The belt defines a first side having one of a first plurality of notches and a first plurality of teeth and an opposing second side having one of a second plurality of notches and a second plurality of teeth. The first sprocket defines the other of the first plurality of notches and the first plurality of teeth and the secondary sprockets define the other of the second plurality of notches and the second plurality of teeth. The first plurality of teeth engage the first plurality of notches and the second plurality of teeth engage the second plurality of notches, whereby rotation of the first sprocket about the axis of rotation engages the first plurality of teeth with the first plurality of notches and the second plurality of teeth with the second plurality of notches.

22 Claims, 5 Drawing Sheets

(56) References Cited

FOREIGN PATENT DOCUMENTS

| | | | |
|---|---|---|---|
| DE | 41 13 624 | A1 | 10/1992 |
| DE | 4113624 | A1 * | 10/1992 |
| DE | 197 31 004 | A1 | 1/1999 |
| DE | 203 19 219 | U1 | 5/2004 |
| EP | 0 945 540 | A2 | 9/1999 |
| EP | 1 241 292 | A1 | 9/2002 |
| EP | 1241292 | A1 * | 9/2002 |
| FR | 1 038 146 | | 9/1953 |
| FR | 1 144 606 | | 10/1957 |
| GB | 2212563 | A * | 7/1989 |

OTHER PUBLICATIONS

International Preliminary Report on Patentability for International application No. PCT/US2006/027057 mailed Oct. 30, 2007.

Internatioinal Search Report for International application No. PCT/US2006/027057 mailed Nov. 10, 2006.

Written Opinion of the International Searching Authority for International application No. PCT/US2006/027057 mailed Nov. 10, 2006.

* cited by examiner

BELT-DRIVEN DRIVE-TRAIN

CROSS-REFERENCE TO RELATED APPLICATIONS

This application claims priority to U.S. Provisional Application No. 60/698,719, filed Jul. 12, 2005.

BACKGROUND OF THE INVENTION

This invention generally relates to drive-train assemblies, and more particularly to a belt-driven drive-train assembly for performing a power conversion.

Many industries require the performance of a power conversion, i.e., the conversion of mechanical power into electrical power. For example, the wind turbine industry is a rapidly growing segment of the electric power generation industry. Wind turbines provide a method for extracting energy from wind and converting the energy into electricity to be supplied either for individual use or into utility power grids. The conversion of wind energy to electrical energy is accomplished by coupling a turbine rotor blade through a drive-train assembly to a power conversion unit, such as an electrical power generator, so that the passage of wind over the turbine rotor blades results in the rotation of a rotor of the power conversion unit.

One known drive-train assembly for a wind turbine includes a main shaft that connects a blade rotor hub of a turbine rotor blade to a low speed input of a gearbox. A generator is connected to a high speed output of the gearbox. The turbine rotor blade drives the low speed shaft of the gearbox, which transforms the torque and speed of the turbine rotor blade to the required torque and speed of the generator. Often the gearbox includes a complex set of planetary gears, which may include sun, planet and ring gears, that provide the means to transmit the torque from the turbine rotor blades to the generator. With time, small metallic particles accumulate within the gearbox as the surfaces of the gears rub together. The accumulation of the metallic particles greatly accelerates the degradation of the entire gear box. Oil sensors, filters in the gear box oil circuitry, and ultrasonic sensors for the detection of frequencies within the gear box indicative of components undergoing rapid wear are known to alleviate these gearbox reliability problems. However, these solutions are sophisticated and expensive.

In addition, drive-train assemblies that utilize gearbox based designs encounter cost and size limitations as the turbine rotor blade diameter is increased beyond current standard lengths of approximately 60 to 70 meters. In particular, the weight and cost of the gearbox is determined by the torque carrying capacity of the low speed input of the gear box. This torque capacity must increase with approximately the cube of the turbine rotor blade diameter, as the rotational speed decreases with the rotor blade diameter to maintain a turbine rotor blade tip speed which is within the allowable noise generation limits. Disadvantageously, the cost and weight of the gear box rapidly becomes prohibitively high as the length of the turbine rotor blade is increased.

Another known drive-train assembly for wind turbines includes a main shaft which connects the turbine rotor blade directly to a large generator. The electrical rotor inside the generator rotates in unison with the turbine rotor blade. These drive-train assemblies also create cost and weight problems. In fact, known direct drive generator drive-train assemblies are nearly twice as heavy as gearbox design drive-train assemblies due to the rapid increase in cost and weight associated with increasing turbine rotor blade diameter. This rapid increase stems from the cubic growth in weight required in response to the slower revolution of the turbine rotor blade. Additionally, direct drive generators necessitate heavy generator frames built to tight tolerances. Disadvantageously, this requirement may be expensive and difficult to manufacture.

Accordingly, it is desirable to provide an improved drive-train assembly for performing a power conversion that is inexpensive, reliable and that provides modularity in design.

SUMMARY OF THE INVENTION

An example drive train assembly for a power conversion system includes a first sprocket which defines an axis of rotation, at least two secondary sprockets adjacent to the first sprocket, and at least one belt. The axis of rotation lies outside of an area defined by the belt. The belt is operable to transfer mechanical power between the first sprocket and the secondary sprockets in response to a rotation of the first sprocket about an axis of rotation. The belt defines a first side having one of a first plurality of notches and a first plurality of teeth and an opposing second side having one of a second plurality of notches and a second plurality of teeth. The first sprocket defines the other of the first plurality of notches and the first plurality of teeth and the secondary sprockets define the other of the second plurality of notches and the second plurality of teeth.

In one example, the first plurality of teeth engage the first plurality of notches and the second plurality of teeth engage the second plurality of notches, whereby rotation of the first sprocket about the axis of rotation engages the first plurality of teeth with the first plurality of notches and the second plurality of teeth with the second plurality of notches. In one example, the secondary sprockets are each rotationally connected to a power conversion unit to convert the mechanical energy to electrical energy. In one example, the secondary sprockets are mounted exteriorly from a nacelle structure of the power conversion system by a mount system.

An example wind turbine assembly includes a tower that supports a nacelle structure, a hollow shaft rotationally attached to the nacelle structure and that houses a belt-driven drive-train having at least one belt, and a turbine rotor blade connected to the hollow shaft and rotational about an axis of rotation of the hollow shaft. The axis of rotation lies outside of an area defined by the belt. The rotation of the turbine rotor blade is transmitted to a power conversion unit rotationally attached to the belt-driven drive-train to perform a power conversion. In one example, the belt-driven drive-train comprises a first belt and a second belt. The first belt is positioned adjacent to the second belt and each belt is looped about at least two secondary sprockets.

The various features and advantages of this invention will become apparent to those skilled in the art from the following detailed description. The drawings that accompany the detailed description can be briefly described as follows.

DETAILED DESCRIPTION OF THE PREFERRED EMBODIMENT

Figure 1:
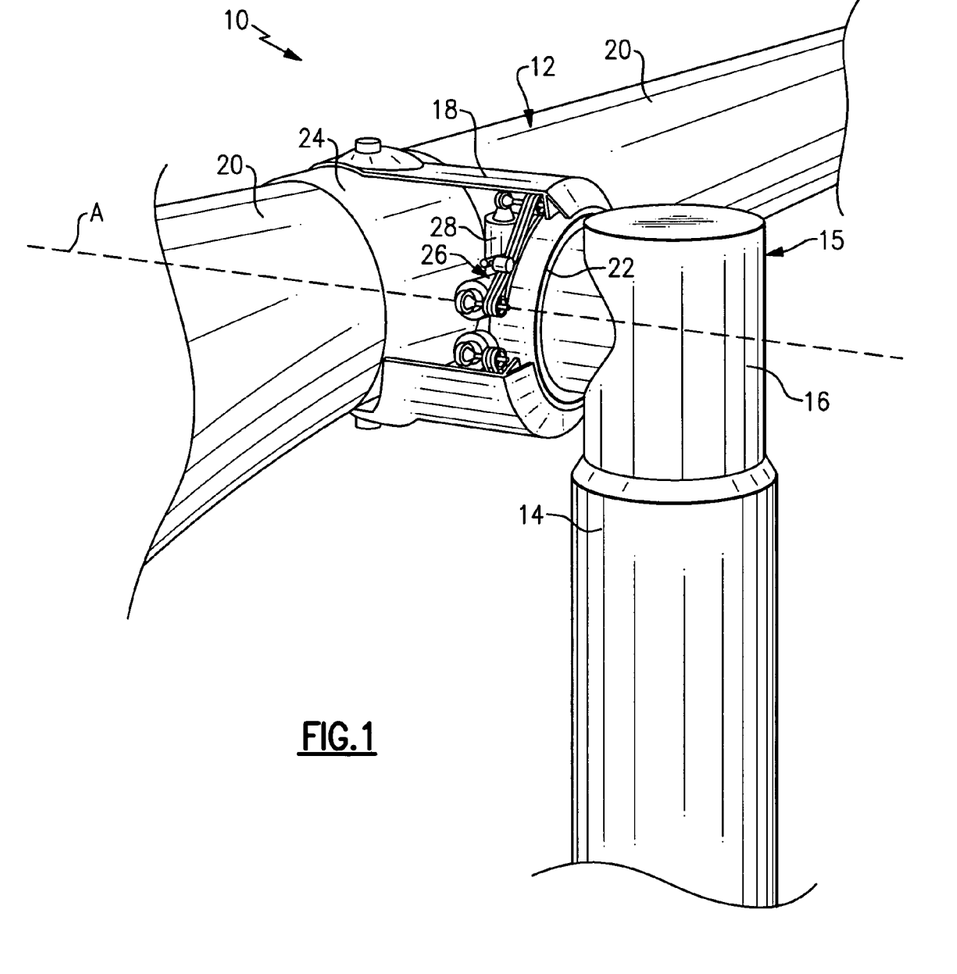
FIG. 1 illustrates a power conversion system having a drive-train assembly according to the present invention.

Referring to FIG. 1, a power conversion system 10 for performing a power conversion, such as transforming mechanical power into electrical power or vise-versa, is illustrated. The present invention is described in terms of a wind turbine assembly 12 that converts mechanical power generated by the passage of wind into electrical power. Although the present invention is described in terms of a wind turbine assembly 12, it should be understood that the features and advantages of this invention may be utilized by any power conversion system known in the art, including but not limited to water-based power conversion systems and hydraulic-based power conversion systems.

The wind turbine assembly 12 includes a tower 14, a nacelle structure 16 supported near an end 15 of the tower 14, a hollow shaft 18 rotationally attached to the nacelle structure 16, and a turbine rotor blade 20. The hollow shaft 18 defines an axis of rotation A. In one example, the hollow shaft 18 is rotationally attached to the nacelle structure 16 via a spinner bearing 22. However, any other known attachment means which permit rotation of the hollow shaft 18 about the axis of rotation A may be utilized according to the present invention.

The turbine rotor blade 20 is rotationally connected to the hollow shaft 18. In one example, the hollow shaft 18 is connected to a rotor blade hub 24 of the turbine rotor blade 20 via teeter hinges, or in any other known manner. Therefore, the turbine rotor blade 20 and the hollow shaft 18 rotate in unison about the axis of rotation A as wind, for example, passes over the turbine rotor blade 20.

The hollow shaft 18 provides the structural support for the turbine rotor blade 20 and receives and transmits a torque generated by the turbine rotor blade 20. The hollow shaft 18 is shown partially cut-away to illustrate that it also houses a drive-train 26. In one example, the drive-train 26 is a belt-driven drive-train, as is further discussed below.

The drive-train 26 includes at least one power conversion unit 28 which is rotationally attached to the drive-train 26 to perform a power conversion. For example, rotation of the turbine rotor blade 20 is transmitted through the drive-train 26 to the power conversion unit 28 to convert mechanical energy to electrical energy. The hollow shaft 18 further encloses the drive-train 26 and the power conversion unit 28 and protects these components from inclement weather or other hardships.

Figure 2:
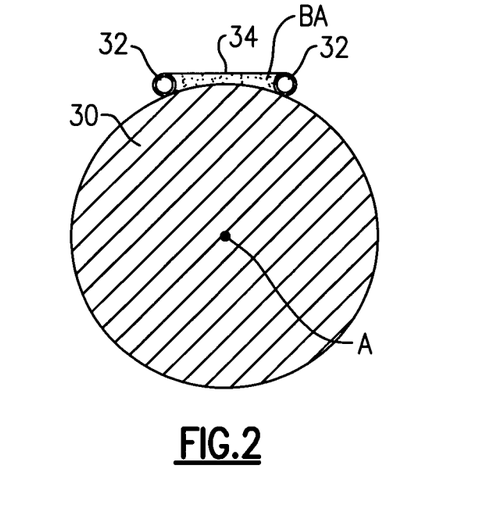
FIG. 2 illustrates an example drive-train according to the present invention.

Referring to FIG. 2, and with continuing reference to FIG. 1, an example drive-train 26 for use with the power conversion system 10, such as a wind turbine assembly, is illustrated. The drive-train 26 includes a primary sprocket 30, at least two secondary sprockets 32 and at least one belt 34. The size of the primary sprocket 30 varies according to the size of the turbine rotor blade 20 of the wind turbine assembly 12. In one example, the primary sprocket 30 is scaled in direct proportion to the diameter of the turbine rotor blade 20. The primary sprocket 30 is attached to the hollow shaft 18 at the location of structural connection between the hollow shaft 18 and the spinner bearing 22. Therefore, the primary sprocket 30, the hollow shaft 18 and the turbine rotor blade 20 rotate in unison about the axis of rotation A.

The secondary sprockets 32 are mounted adjacent to the primary sprocket 30. In one example, the two secondary sprockets 32 are mounted to the nacelle structure 16 exteriorly from the primary sprocket 30. The secondary sprockets 32 are of a different diameter than the primary sprocket 30. In one example, the secondary sprockets 32 comprise a smaller diameter than the diameter of the primary sprocket 30.

The belt 34 at least partially contacts the primary sprocket 30 and the secondary sprockets 32. The belt 34 preferably does not entirely encircle the primary sprocket 30. That is, the axis of rotation A lies outside of an area BA enclosed by the belt 34. In one example, the belt 34 is a synchronous belt having tension members of a high strength material surrounded by an elastomeric material that provides high transmission efficiency and increased ability to transmit loads. In another example, the belt 34 is a self-lubricated chain. The belt 34 is looped around the at least two secondary sprockets 32 and contacts only a partial section of the perimeter of the primary sprocket 30. Therefore, the belt 34 is operable to transfer mechanical power between the primary sprocket 30 and the secondary sprockets 32 in response to the rotation of the turbine rotor blade 20, and therefore the primary sprocket 30, about the axis of rotation A.

Figure 3:
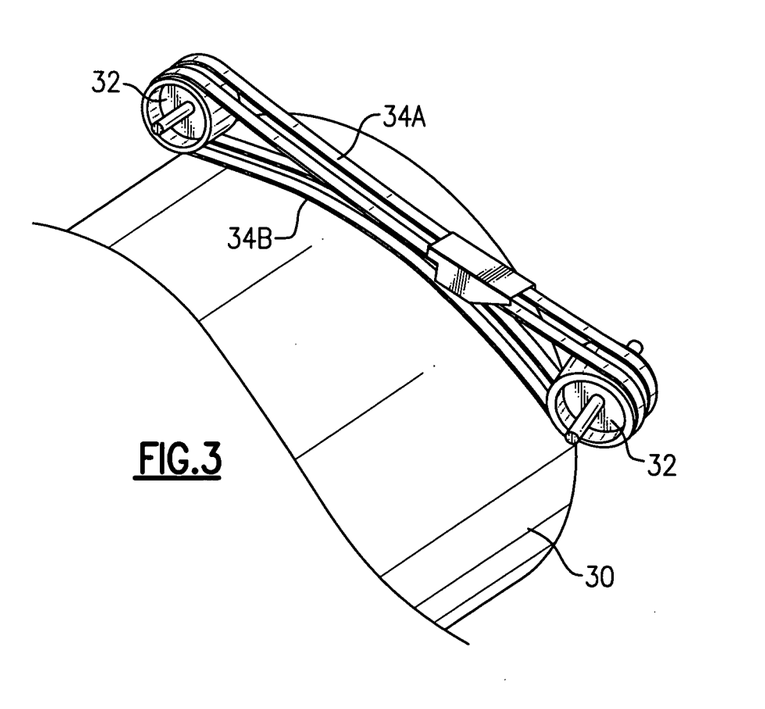
FIG. 3 illustrates an example belt configuration for use within the drive-train assembly according to the present invention.

Referring to FIG. 3, the belt 34 may include two narrow width belts 34A and 34B used in parallel as opposed to single, wide belt. Narrow width belts are more tolerant to misalignment. Therefore, the use of multiple narrow width belts in parallel within the drive-train 26 allows for less stringent requirements of belt alignment with the primary sprocket 30 and the secondary sprockets 32.

Figure 4A:
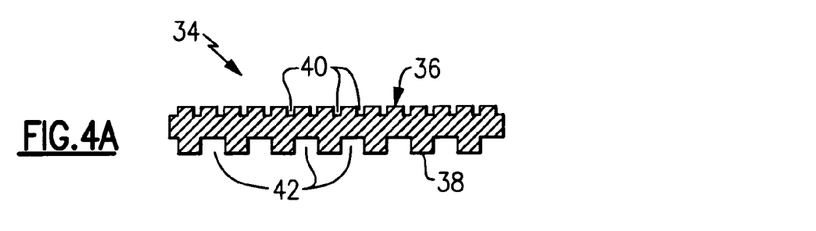
FIG. 4A illustrates features of an example belt for use within the drive-train assembly according to the present invention.

As shown in FIG. 4A, the belt 34 includes a first side 36 and an opposing second side 38. The first side 36 of the belt 34 includes a first set of notches 40 and the opposing second side 38 of the belt 34 includes a second set of notches 42. The first set of notches 40 and the second set of notches 42 each define a notch pitch size. In one example, the notch pitch size of the first set of notches is different from the notch pitch size of the second set of notches 42. One of the first set of notches 40 and the second set of notches 42 includes a notch pitch that is optimized for the primary sprocket's 30 diameter and the other of the first set of notches 40 and the second set of notches 42 includes a notch pitch that is optimized for the diameter of the secondary sprockets 32.

Figure 4B:
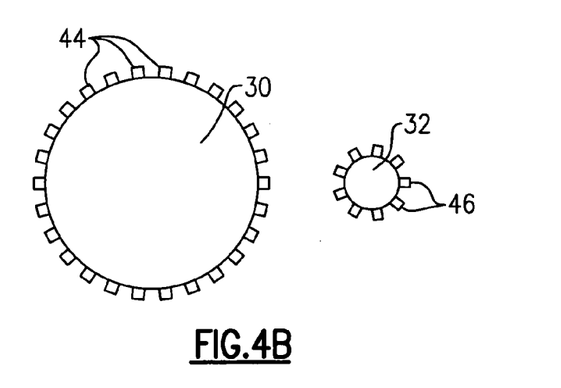
FIG. 4B illustrates a schematic view of components of the drive-train assembly according to the present invention.

Referring to FIG. 4B, the primary sprocket 30 includes a first set of teeth 44 and the secondary sprockets 32 include a second set of teeth 46. Each set of teeth 44, 46 engages a set of notches 40, 42 which includes the pitch size that is optimized for that respective set of teeth 44, 46. The example teeth-notch engagement lowers friction between the belt 34 and both the primary sprocket 30 and secondary sprockets 32 and therefore lowers material stresses and prolongs belt life. In addition, the teeth-notch engagement provides position traction between the belt 34 and the sprockets 30, 32 that avoids slip. The greater the number of teeth 44, 46 defined by the sprockets 30, 32, the more uniformly load is transferred between the belt 34 and the sprockets 30, 32.

Although the sets of teeth 44, 46 are defined herein as components of the sprockets 30, 32 and the notches 40, 42 are defined as components of the belt 34, the opposite configuration is also contemplated (i.e., teeth defined by belt and notches defined by sprockets).

In one example, the first set of notches 40 and the second set of notches 42 are related by a non-integer pitch ratio. For example, assume the first set of notches 40 include a pitch size of 20 mm and the second set of notches 42 include a pitch size of 14 mm. The pitch ratio of these two pitch sizes is 1.4285 (i.e., a non-integer). The use of a non-integer related pitch ratio of the notches 40, 42 on the first side 36 and opposing second side 38 of the belt 34 reduces coupling between the belt 34 and both the primary sprocket 30 and the secondary sprockets 32 and thereby reduces unwanted vibrations. That is, the use of notches having different pitch sizes that are related by a non-integer pitch ratio removes unwanted resonances caused by cyclic tension in the belt 34 that may occur where the pitch size of the first set of notches 40 and the second set of notches 42 are related by a small integer.

Figure 4C:
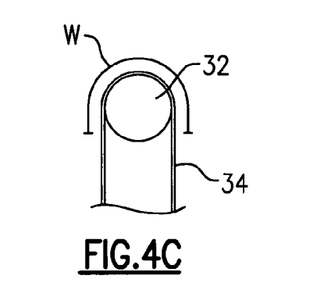
FIG. 4C is a schematic view a wrap angle defined between the belt and the secondary sprockets according to the present invention.

Referring to FIG. 4C, the belt 34 is looped around at least two of the secondary sprockets 32 to define a wrap angle W (i.e., an arc-of-contact). The wrap angle W determines the ability of the belt 34 to transmit force onto the secondary sprockets 32. In one example, the wrap angle W is at least 90°. In another example, the wrap angle W between the belt 34 and the secondary sprockets 32 is 180°. The greater the wrap angle W, the more teeth are engaged in notches 40, 42 of the belt 34. A large wrap angle W prolongs belt life and lowers material stresses on the belt. It should be understood that the actual wrap angle utilized will vary depending on the requirements of the power conversion system 10.

Figure 4D:
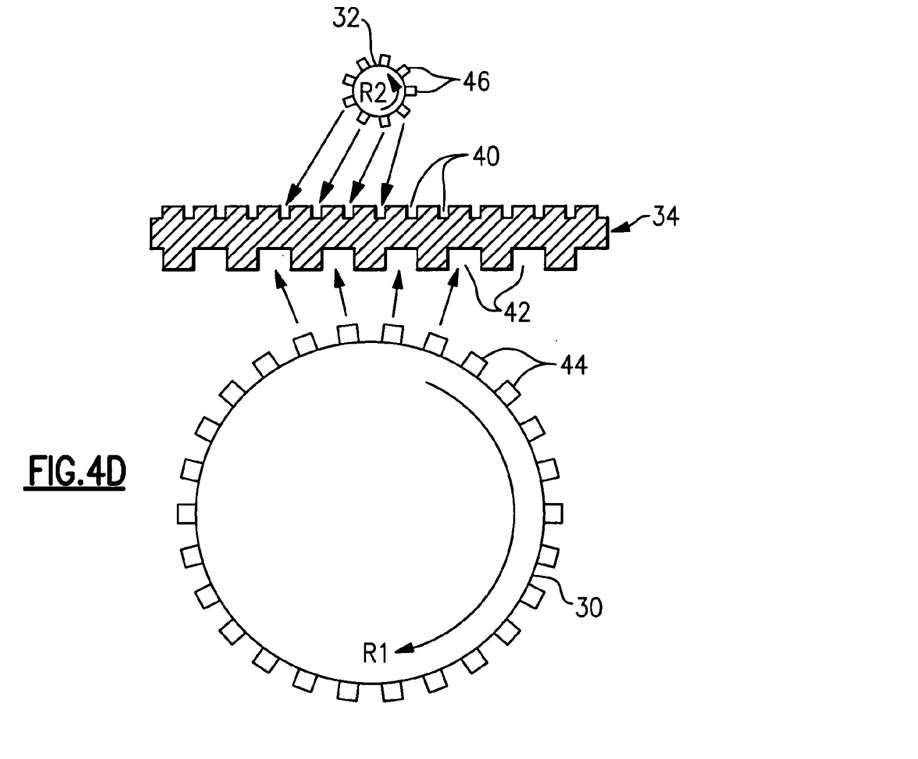
FIG. 4D is a schematic view of a teeth-notch engagement of the drive-train according to the present invention.

Referring to FIG. 4D, the engagement between the teeth 44, 46 and the notches 40, 42 is illustrated. Rotation of the primary sprocket 30 in a direction R1 results in engagement of the first set of teeth 44 with one of the first set of notches 40 and the second set of notches 42 of the belt 34. This results in cycling of the belt 34 about the two secondary sprockets 32. The secondary sprockets 32 rotate in an opposite direction R2 compared to the primary sprocket 30 in response to engagement of the second set of teeth 46 with the other of the first set of notches 40 and the second set of notches 42. Rotation of the secondary sprockets 32 drives a power conversion unit 28, as is further discussed below.

The static contact defined between the belt 34 and the primary sprocket 30 allows heat to be conducted away from the belt 34. Heat is communicated through the primary sprocket 30 and further through the hollow shaft 18 to the atmosphere by convection from the outer surface of the hollow shaft 18. Therefore, the belt 34 is passively cooled without the need of additional hardware, such as gearbox oil coolers.

Figure 5:
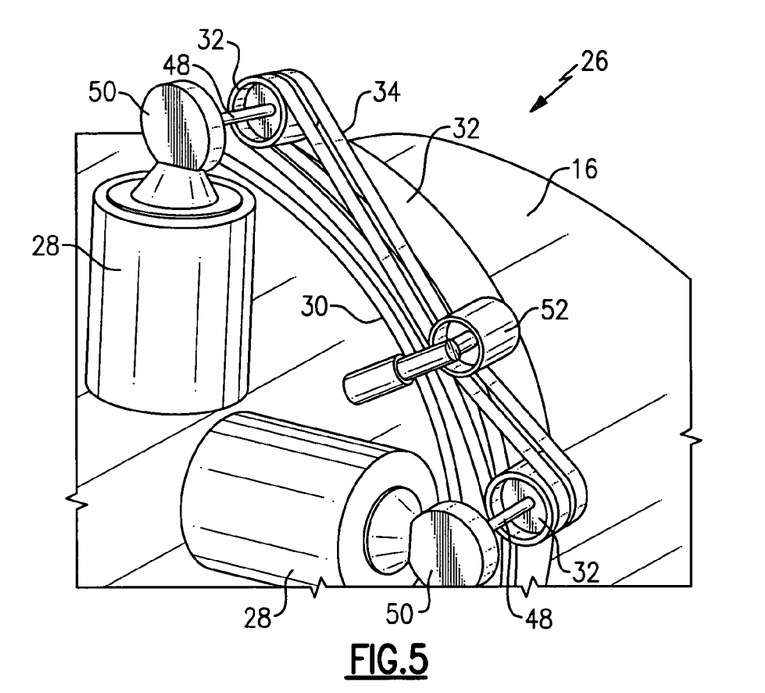
FIG. 5 illustrates a schematic view of the drive-train assembly of the present invention.

Referring to FIG. 5, each secondary sprocket 32 is rotationally connected to a power conversion unit 28 to drive the power conversion unit 28 when the secondary sprockets 32 undergo rotation. In one example, the power conversion unit 28 is a generator. In another example, the power conversion unit 28 is an air compressor. It should be understood that any known power conversion unit may be utilized with the drive-train according to the present invention. The power conversion unit 28 converts the mechanical power that results from rotation of the turbine rotor blade 20 into electrical power, for example.

As stated, the belt 34 is looped around at least two of the secondary sprockets 32 and each secondary sprocket 32 is rotationally connected to a power conversion unit 28. In one example, a different number of teeth 44, 46 are used on each secondary sprocket 32 paired with a single belt 34. This causes the power conversion units 28 to cycle at different revolutions per minute (rpm) and results in a varying phase relationship between each power conversion unit 28. Advantageously, the varying phase relationship between the power conversion units 28 reduces the sympathetic vibrations experienced by the drive-train 26 and reduces the mechanical load on the belt 34.

In one example, the secondary sprockets 32 are coupled to the power conversion unit 28 with a drive shaft 48. In another example, the secondary sprockets 32 are directly attached to the power conversion unit 28. It should be understood that the coupling between the secondary sprockets 32 and the power conversion units 28 may be accomplished in any known manner.

The torque produced at each secondary sprocket 32 is proportional to the instantaneous power produced by the power conversion unit 28 associated therewith. By controlling the voltage and current in each power conversion unit 28, an active load management for each belt 34 is achieved. Specifically, the power conversion unit 28 power is controlled to dampen and equalize loading of the belt 34 and to dampen dynamic system vibrations to reduce noise, enhance mechanical stability and enhance belt life.

The example drive-train 26 may also include a gearbox 50 positioned between each secondary sprocket 32 and each power conversion unit 28. Inclusion of gearboxes 50 is especially advantageous for multi-megawatt wind turbines, which are characterized by a slow turning turbine rotor blade 20. Inclusion of gearboxes 50 in these types of wind turbines reduces the size and weight requirements of the power conversion unit 28 by increasing the rotational speed of the power conversion unit via the gear box 50. Due to the torque reduction at the low speed shaft of the gearbox produced by the use of multiple generators and by the rotational speed increase produced by the belt-driven drive-train 26, the gearbox 50 receives only a small fraction of the total turbine rotor blade 20 torque. Therefore, the gearbox 50 may be included within the drive-train 26 at a low cost.

However, in smaller wind turbines (i.e., below 250 kilowatts in maximum power), the rotational speed of the turbine rotor blade 20 is sufficiently high that the speed increase produced by the ratio of the primary sprocket 30 with respect to the secondary sprockets 32 is sufficient to allow a direct rotational coupling (i.e., without intermediate gears) between each secondary sprocket 32 and each power conversion unit 28. Therefore, gearboxes 50 are not needed in all applications.

The drive-train 26 further includes at least one tensioner 52. The tensioner 52 is mounted to the nacelle structure 16 and communicates a force on the belt 34 in a generally radial direction to maintain tension on the belt 34 as it is looped around the secondary sprockets 32. The tensioner 52 is mounted to the nacelle structure 16 near the at least two secondary sprockets 32. In one example, the tensioner 52 is mounted between the secondary sprockets 32. The tensioner 52 includes an elastic material, such as a spring or a piston controlled by a hydraulic circuit, that compensates belt elongation to maintain an essentially constant tension on the belt 34. Additionally, the tensioner 52 may include a mechanical energy dissipative element, such as a dashpot, to provide damping to the belt 34. In another example, a tensioner is provided integrally with a mounting system, which is further discussed below.

Figure 6:
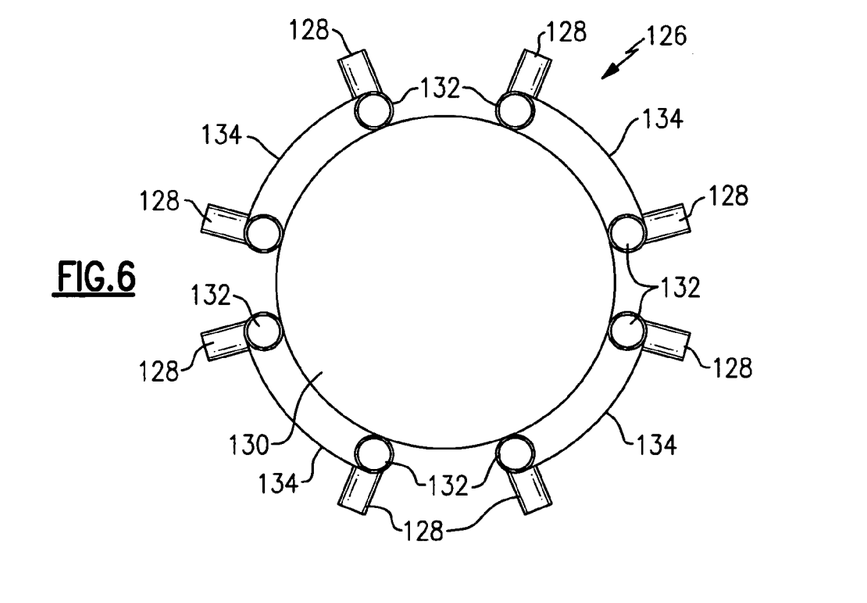
FIG. 6 illustrates a second example drive train assembly according to the present invention.

Referring to FIG. 6, a second example drive-train 126 is illustrated. The drive train 126 includes a primary sprocket 130, a plurality of secondary sprockets 132 and a plurality of belts 134. The plurality of secondary sprockets 132 are positioned radially about the nacelle structure 116. In one example, eight secondary sprockets 132 are included in the drive-train 126. At least one of the plurality of belts 134 is associated with at least two of the plurality of secondary sprockets 132. In another example, two narrow width belts positioned adjacent to one another are looped around at least two secondary sprockets 132.

At least one power conversion unit 128 is rotationally connected to each of the plurality of secondary sprockets 132. The drive-train 126 functions to perform a power conversion, such as the conversion of mechanical energy to electrical energy, in a similar manner to that of the drive train 26 as shown in FIGS. 1-4.

One advantage provided by the present invention is the ability to provide modularity in the construction of the drive train. The actual number of secondary sprockets and belts utilized on the system varies according to the size of the wind turbine. Therefore, only one or two generator designs are needed for the entire range of increasing power wind turbine diameters, and total drive train power is set by the number of generators employed and the diameter of the primary sprocket (which increases as a function of the turbine rotor blade diameter). Since the hollow shaft of a power conversion system can easily be made to scale geometrically with the turbine rotor blade diameter, the diameter of the primary sprocket can be made to scale in a similar manner. Accordingly, the increased perimeter length of the primary sprocket permits additional secondary sprockets, generators, belts and other components to be added to the system. This procedure allows a common, single generator size to be carried by the turbine manufacturer, thereby providing cost savings through both mass production and standardization of inventory parts.

In addition, the example belt-driven drive train 126 provides functional redundancy. That is, the loss of a single wide belt 134, or equivalently of two adjacent narrow width belts, results in the loss of two power conversion units 128. The power conversion system can continue to produce power, albeit at a reduced rate, with the remaining power conversion units. Moreover, where two or more narrow width belts provided adjacent to one another are utilized, a broken belt detector device may be provided within the drive-train to allow continued operation at reduced power while providing an alert that a belt needs replaced. In off-shore applications, wherein access to the power conversion system is limited to the summer months only because of rough seas and inclement weather, the ability to continue to produce energy, results in a significant increase in energy production as compared to power conversion systems having conventional drive-trains. In addition, replacement of belts and power conversion units is simplified as a result of the reduced size and weight of these components.

Figure 7:
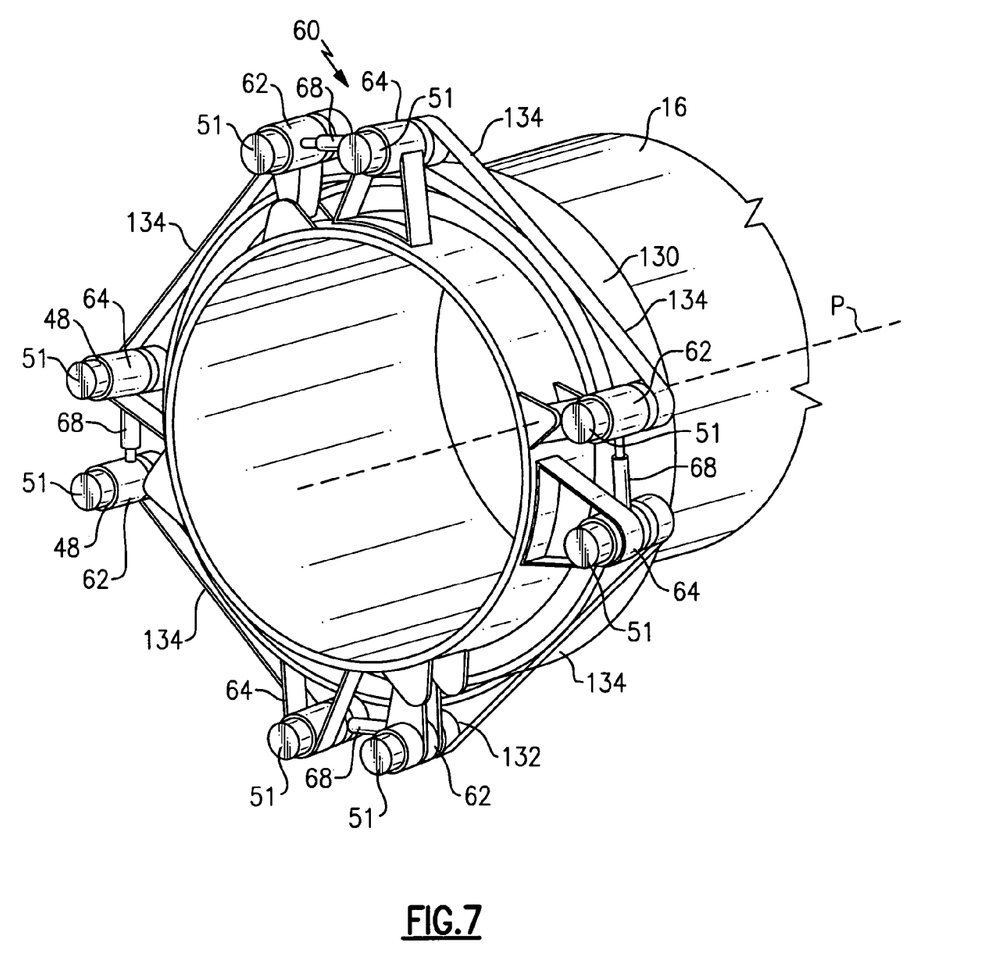
FIG. 7 illustrates a mount system for mounting the drive train assembly according to the present invention.

Referring to FIG. 7, a mount system 60 for mounting the example drive-train 126 is illustrated. The mount system 60 may also be used to mount the drive-train 26, or any other similar belt-driven drive train. The illustrated example includes eight secondary sprockets 132 radially spaced about the nacelle structure 16. It should be understood that the mount system 60 according to the present invention may be utilized regardless of the number of secondary sprockets utilized within the drive trains 26, 126 respectively.

The mount system 60 includes pivot mounts 62 and stationary mounts 64. The pivot mounts 62 and the stationary mounts 64 are affixed to the nacelle structure 16 in any known manner. In one example, the pivot mounts 62 are pivotable with respect to the nacelle structure 16 about a pivot access P. In one example, the pivot mounts 62 pivot about a dowel pin.

The pivot mounts 62 and the stationary mount 64 are positioned radially about the nacelle structure 16 in an alternating manner. That is, at least one of the belts 134 is looped around at least two secondary sprockets 132, wherein one of the secondary sprockets 132 is connected to a pivot mount 62 via the drive shaft 48 and the other of the secondary sprockets 132 is connected to a stationary mount 64 via the drive shaft 48. The alternating positioning of the pivot mounts 62 with respect to the stationary mounts 64 removes the possibility of oscillations in the system. In one example, the gearbox 50 attaches to a plate 51 of drive shaft 48 to provide the rotational connection to the secondary sprockets 32.

A tensioner 68 is positioned between each pivot mount 62 and stationary mount 64. The tensioner 68 may be used in addition to or in place of the tensioner 52 as shown and described in FIG. 4. Belt tensioning is provided by the mount system 60 through the pivotable movement of the pivot mounts 62 relative to the nacelle structure 16. Movement of the pivot mounts 62 allow the tensioners 68 to apply a force perpendicular to the belt direction and thereby place tension on the belt. In another example, tension is provided by a moveable idler. In yet another example, tension is provided by movement of at least one power conversion unit.

The foregoing description shall be interpreted as illustrative and not in any limiting sense. A worker of ordinary skill in the art would recognize that certain modifications would come within the scope of this invention. For that reason, the follow claims should be studied to determine the true scope and content of this invention.

What is claimed is:

1. A drive-train assembly for a power conversion system, comprising:
    a first sprocket that defines an axis of rotation;
    at least two secondary sprockets adjacent to said first sprocket; and
    at least one belt operable to transfer mechanical power between said first sprocket and said at least two secondary sprockets in response to rotation of said first sprocket about said axis of rotation, wherein said axis of rotation is outside an area defined by said at least one belt, and said at least one belt is looped around only two of said at least two secondary sprockets.

2. The assembly as recited in claim 1, wherein said at least one belt comprises a first side and an opposing second side, said first side defining one of a first plurality of notches and a first plurality of teeth, said opposing second side defining one of a second plurality of notches and a second plurality of teeth, said first sprocket defining the other of said first plurality of notches and said first plurality of teeth and said at least two secondary sprockets defining the other of said second plurality of notches and said second plurality of teeth, wherein said first plurality of teeth engage said first plurality of notches and said second plurality of teeth engage said second plurality of notches.

3. The assembly as recited in claim 2, wherein said first plurality of teeth engage said first plurality of notches in response to the rotation of said first sprocket about said axis of rotation, wherein the engagement of said first plurality of teeth with said first plurality of notches is operable to rotate said at least one belt about said at least two secondary sprockets in response to the rotational engagement of said second plurality of teeth with said second plurality of notches.

4. The assembly as recited in claim 2, wherein said first plurality of notches define a first pitch size that is different from a second pitch size defined by said second plurality of notches, wherein said first pitch and said second pitch are related by a non-integer pitch ratio.

5. The assembly as recited in claim 1, wherein said at least two secondary sprockets are each rotationally connected to a power conversion unit, wherein said mechanical power from said at least two secondary sprockets is converted to electrical power by said power conversion unit.

6. The assembly as recited in claim 5, wherein said power conversion unit includes at least one of a generator and an air compressor.

7. The assembly as recited in claim 5, further comprising a gearbox positioned between each of said at least two secondary sprockets and said power conversion units.

8. The assembly as recited in claim 5, wherein said power conversion unit is an air compressor.

9. The assembly as recited in claim 1, wherein said at least one belt comprises a first belt and a second belt, wherein said first belt is positioned adjacent to said second belt, said first belt and said second belt being looped around said at least two secondary sprockets.

10. The assembly as recited in claim 1, wherein said at least one belt is looped around said at least two secondary sprockets to define a wrap angle, wherein said wrap angle is at least 90 degrees.

11. The assembly as recited in claim 1, further comprising a mount system that mounts said at least two secondary sprockets exteriorly from said first sprocket, said mount system including a first mount for mounting one of said at least two secondary sprockets and a second mount for mounting the other of said at least two secondary sprockets, wherein one of said first mount and said second mount is pivotally mounted and the other of said first mount and said second mount is fixedly mounted.

12. The assembly as recited in claim 1, further comprising a tensioner mounted near said at least two secondary sprockets.

13. The assembly as recited in claim 12, wherein said tensioner is mounted between said at least two secondary sprockets.

14. The assembly as recited in claim 1, wherein said at least two secondary sprockets comprise a plurality of secondary sprockets spaced about a nacelle structure and said at least one belt comprises a plurality of belts, wherein each of said plurality of belts is rotationally connected to at least two of said plurality of secondary sprockets.

15. The assembly as recited in claim 1, wherein said at least one belt comprises at least one of a synchronous-belt and a self-lubricated chain.

16. The assembly as recited in claim 1, wherein said at least one belt is a self-lubricated chain.

17. A drive-train assembly for a power conversion system, comprising:
   a first sprocket that defines an axis of rotation;
   two secondary sprockets adjacent to said first sprocket;
   at least one belt looped around said two secondary sprockets;
   a mount system that mounts said two secondary sprockets exteriorly from said first sprocket, and said mount system includes a first mount that is pivotally mounted and a second mount that is fixedly mounted; and
   at least one power conversion unit in rotational connection with each of said two secondary sprockets.

18. The assembly as recited in claim 17, wherein said axis of rotation of said first sprocket is outside an area defined by said at least one belt.

19. The assembly as recited in claim 17, comprising a nacelle structure, and said first mount and said second mount are affixed to said nacelle structure, wherein said first mount is pivotable relative to said nacelle structure about a pivot axis.

20. The assembly as recited in claim 19, wherein said first mount pivots about a dowel pin.

21. The assembly as recited in claim 17, comprising a tensioner that extends between said first mount and said second mount.

22. The assembly as recited in claim 17, wherein said at least one belt is operable to transfer mechanical power between said first sprocket and said two secondary sprockets.

* * * * *